(12) United States Patent
Suggs

(10) Patent No.: US 8,686,946 B2
(45) Date of Patent: Apr. 1, 2014

(54) DUAL-MODE INPUT DEVICE

(75) Inventor: Bradley Neal Suggs, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 322 days.

(21) Appl. No.: 13/081,546

(22) Filed: Apr. 7, 2011

(65) Prior Publication Data
US 2012/0256839 A1 Oct. 11, 2012

(51) Int. Cl.
*G06F 3/033* (2013.01)
*G09G 5/08* (2006.01)

(52) U.S. Cl.
USPC .......................................... 345/168; 715/863

(58) Field of Classification Search
USPC .................... 345/168, 173; 715/863
See application file for complete search history.

(56) References Cited

U.S. PATENT DOCUMENTS

| | | | |
|---|---|---|---|
| 2006/0209031 A1* | 9/2006 | Burrell | 345/169 |
| 2008/0059915 A1* | 3/2008 | Boillot | 715/863 |
| 2009/0256802 A1 | 10/2009 | Lou et al. | |
| 2009/0315841 A1 | 12/2009 | Cheng et al. | |
| 2010/0149099 A1 | 6/2010 | Elias | |
| 2011/0006991 A1 | 1/2011 | Elias | |
| 2011/0199309 A1* | 8/2011 | Chuang | 345/168 |
| 2012/0044146 A1* | 2/2012 | Stewart et al. | 345/168 |

OTHER PUBLICATIONS

"Wireless Ergonomic Keyboard with Magical Multitouch Trackpad"; http://www.coated.com/wireless-ergonomic-keyboard-with-magical-multitouch-trackpad-100003/; 3 pages.
Brown, Daniel; "MacTouch Pro"; http://www.apple-discounts.com/contest/gallery1.html.

* cited by examiner

*Primary Examiner* — Kevin M Nguyen
(74) *Attorney, Agent, or Firm* — Romiwa C. Akpala

(57) ABSTRACT

Embodiments of the present invention disclose a dual-mode input device. According to one embodiment, the aforementioned device includes an input surface having an input plane. The device also includes an optical sensor having a central projection plane that lies perpendicular to the input plane of the input surface so as to detect gesture input from a user.

15 Claims, 5 Drawing Sheets

DUAL-MODE INPUT DEVICE

BACKGROUND

Providing efficient and intuitive interaction between a computer system and users thereof is essential for delivering an engaging and enjoyable user-experience. Today, most computer systems include a keyboard for allowing a user to manually input information into the computer system, and a mouse for selecting or highlighting items shown on an associated display unit. As computer systems have grown in popularity, however, alternate input and interaction systems have been developed.

For example, touch-based, or touchscreen computer systems allow a user to physically touch the display unit and have that touch registered as an input at the particular touch location, thereby enabling a user to interact physically with objects shown on the display of the computer system. Multi-touch detection systems, in which multiple points of contact are detected, are being increasingly utilized for facilitating user interaction with touch-enabled display devices. Despite the advances in touch-based technology, however, keyboards and mice are often still the preferred input devices for speedy and large data entry activities

BRIEF DESCRIPTION OF THE DRAWINGS

The features and advantages of the inventions as well as additional features and advantages thereof will be more clearly understood hereinafter as a result of a detailed description of particular embodiments of the invention when taken in conjunction with the following drawings in which.

DETAILED DESCRIPTION OF THE INVENTION

Figure 1:
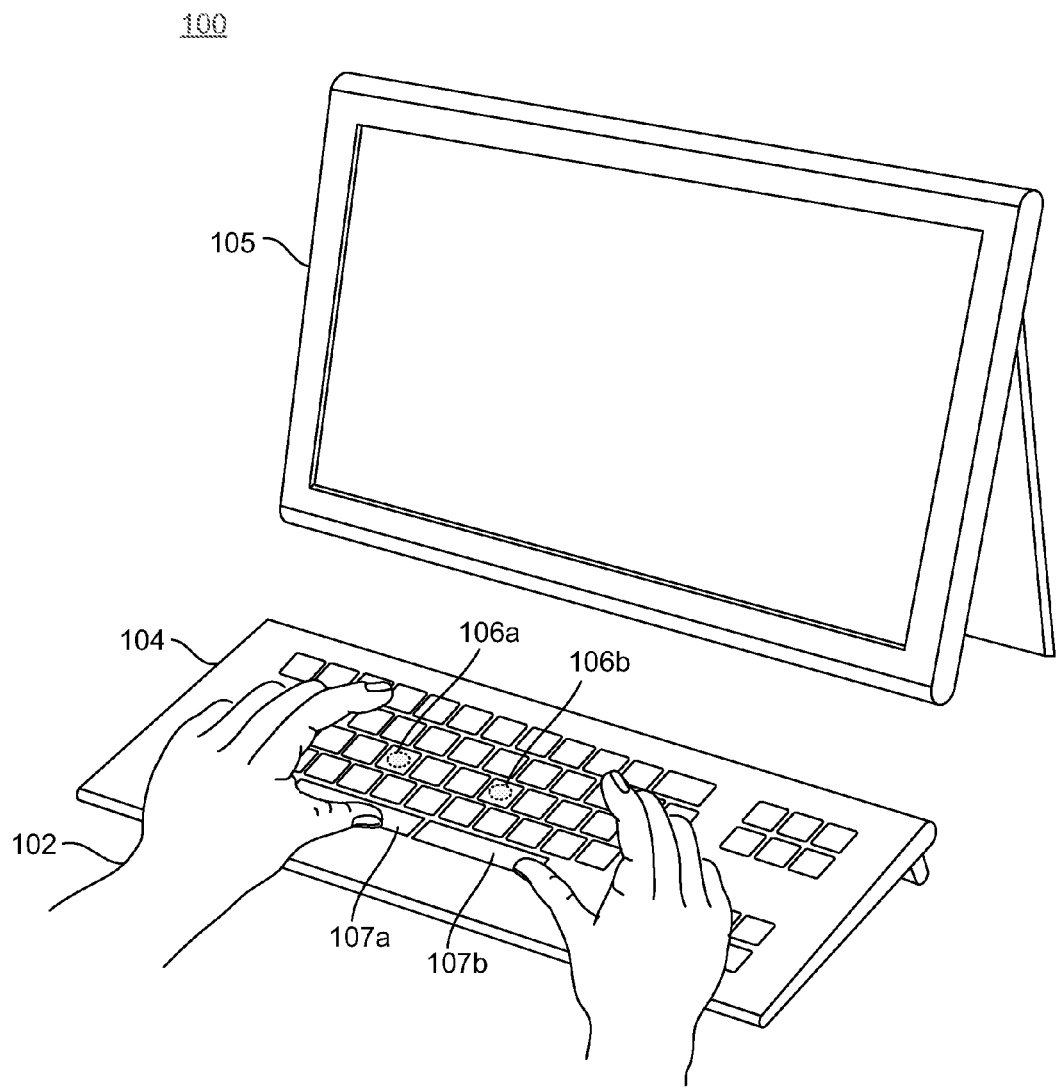
FIG. 1 is a three-dimensional illustration of an operating environment utilizing the dual-mode input device according to an example of the present invention.

The following discussion is directed to various embodiments. Although one or more of these embodiments may be discussed in detail, the embodiments disclosed should not be interpreted, or otherwise used, as limiting the scope of the disclosure, including the claims. In addition, one skilled in the art will understand that the following description has broad application, and the discussion of any embodiment is meant only to be an example of that embodiment, and not intended to intimate that the scope of the disclosure, including the claims, is limited to that embodiment. Furthermore, as used herein, the designators "A", "B" and "N" particularly with respect to the reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the user of similar digits. For example, 143 may reference element "43" in FIG. 1, and a similar element may be referenced as 243 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Modern operating systems anticipate the availability of both keyboard and mouse as input mechanisms yet efficient and robust combination of these well-known technologies has proven challenging. For example, the TrackPoint® keyboard by International Business Machines Corporation (I.B.M.) utilizes a pointing stick, or a small moveable peg positioned in the center of the keyboard for providing a fast mouse input means within the typing area of the keyboard. However, this particular keyboard lacks multi-touch capabilities and also requires a separate element for the pointing stick. Other keyboard solutions include optical cameras for providing alternative input means, but these keyboards also lack multi-touch capability and the placement of the image sensing devices ultimately contributes to detection inaccuracies and inefficiencies during operation.

Referring now in more detail to the drawings in which like numerals identify corresponding parts throughout the views, FIG. 1 is a three-dimensional illustration of an operating environment utilizing the dual-mode input device according to an example of the present invention. As shown here, the operating environment includes a user 102 operating a computing system 100 including a display unit 105 and an input device 104. The display unit 105 is electronically coupled to the input device via a wireless or wired connection. In one example, the input device 104 represents a standard keyboard having mechanical keys and multiple mode activation buttons 107a and 107b such as a split spacebar or similar activation keys. According to one example, two navigation elements or optical sensors 106a and 106b are positioned beneath a surface plane of the keyboard 104 so as to lie coincident with particular keys thereof as will be described in more detail with reference to FIGS. 4A-4B. Such placement serves to ensure that no major hand movement is required by the operating user 102 for execution of a mouse or multi-touch gesture. For example, a user may perform pinch, zoom, and rotate operations in addition to normal mouse-related operations while the input device is in the gesture input mode. In short, examples of the present invention allow co-located functions and operating modes, namely a gesture input mode and a text input mode, to be differentiated by the means of the optical sensors 106a, 106b and mode activation buttons 107a, 107b (e.g., spacebar keys).

Figure 2:
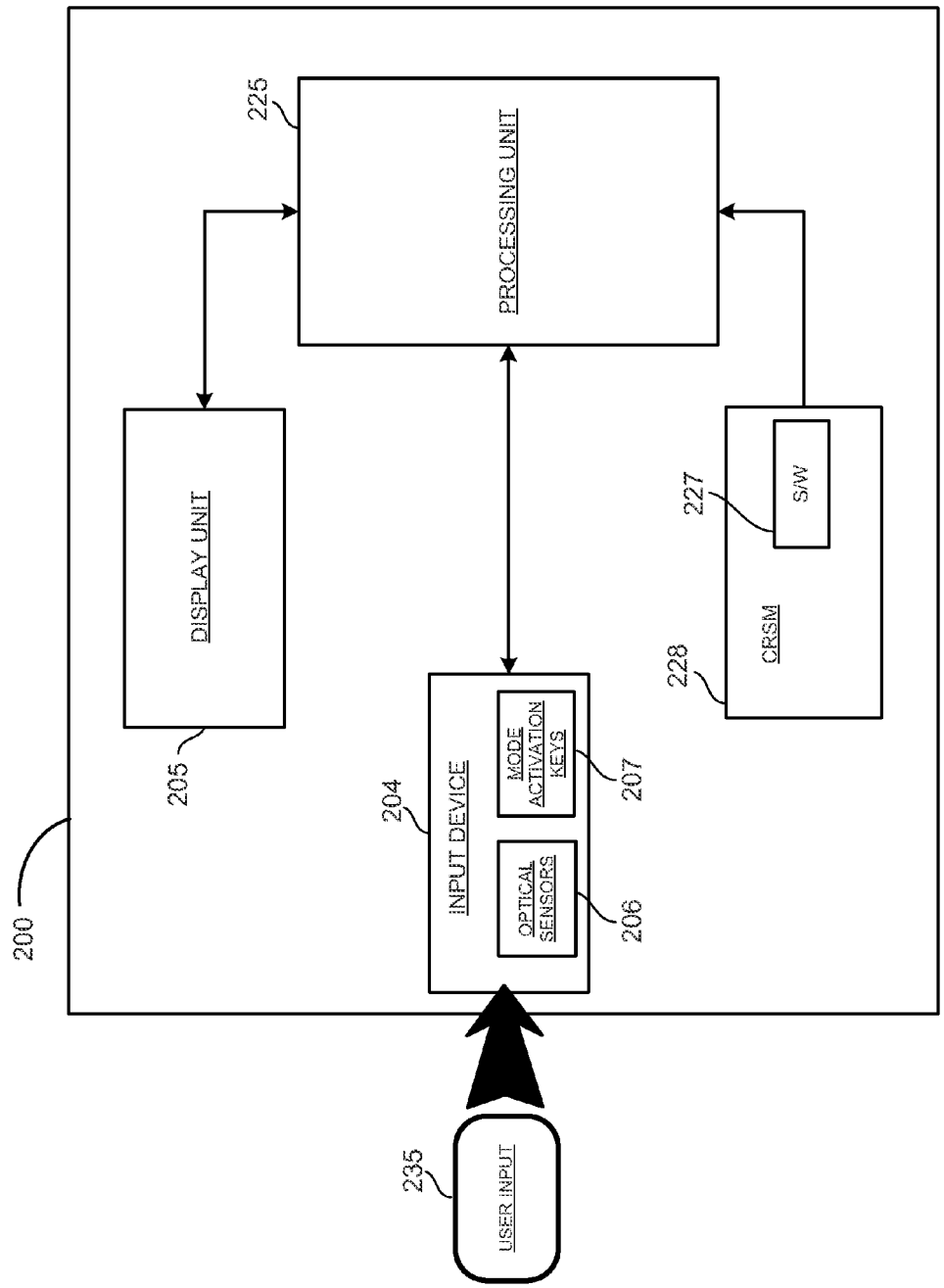
FIG. 2 is a simplified system diagram of a system implementing the dual-mode input device according to an example of the present invention.

FIG. 2 is a simplified system diagram of a system implementing the dual-mode input device according to an example of the present invention. As shown in this example, the system 200 includes a processor 225 coupled to a display unit 205, an input device 204, and a computer-readable storage medium 228. In one embodiment, processor 225 represents a central processing unit (CPU), microcontroller, microprocessor, or logic configured to execute programming instructions on the associated focus-based computing system 200. Input device 204 represents a standard keyboard having multiple spacebar keys. In addition, the input device includes a plurality of optical sensors such as an infrared sensor or basic image capturing device. Display unit 207 represents an electronic visual display configured to display images to an operating user such as a liquid crystal display (LCD) panel, CRT monitor, or touch-enabled display device. Storage medium 228 represents volatile storage (e.g. random access memory), non-volatile store (e.g. hard disk drive, read-only memory, compact-disc read-only memory, flash storage, etc.), or combinations thereof. Furthermore, storage medium 228 includes software 227 that is executable by processor 225 and, that when executed, causes the processor 225 to perform some or all of the functionality described herein.

Figure 3A:
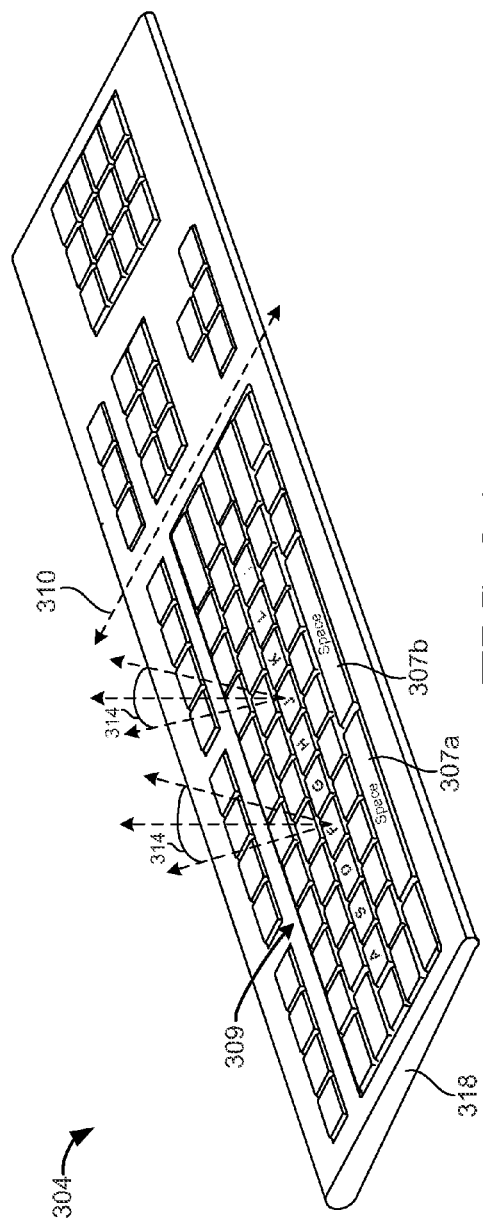
FIGS. 3A and 3B are three-dimensional and side views respectively of the dual-mode input device according to an example of the present invention.
Figure 3B:
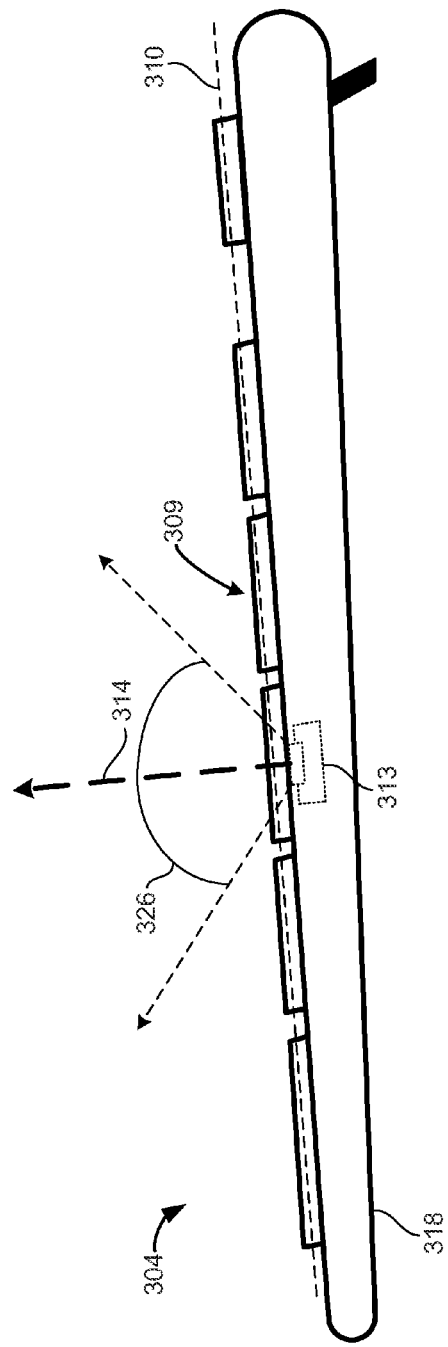

FIGS. 3A and 3B are three-dimensional and side views respectively of the dual-mode input device according to an example of the present invention. As shown in FIG. 3A, the input device 304 includes a plurality of mechanical keys 309 in which at least two keys are designated mode activation/switching keys 307a and 307b for alternating between multiple operating modes, In the present example, a split spacebar (i.e., left spacebar key and right spacebar key) is represented as the mode activation keys 307 due to their location on the standard keyboard layout. More particularly, the positioning of the spacebar keys 307a and 307b allow a user to easily access each mode activation key while in a normal typing position (via thumbs) so as to conveniently switch between operating modes. According to one example, depression of both spacebar keys 307a and 307b may cause the system to operate in mouse or gesture operating mode, while depression of a single spacebar key 307a or 307b would accomplish the customary space text function.

With reference now to the example of FIG. 3B, the input device 304 includes a housing 318 for accommodating a plurality of mechanical keys 309 and optical sensors 313. The input device further includes an input surface place 310 in which the plurality of mechanical keys 309 are formed along. As shown in FIG. 3B, at least one optical sensor 313 is formed beneath a corresponding mechanical key and includes a central plane of projection 314 that is substantially perpendicular to the input surface plane 310. The central projection plane 314 is part of the field of view 326 of the optical sensor 313 and allows for a greater field of depth than traditional methods. More importantly, the field of view 326 and central positioning of the optical sensor 313 within the input device 304 allows the optical sensor 313 to accurately capture hand movements of the operating user while in the gesture input mode.

Figure 4A:
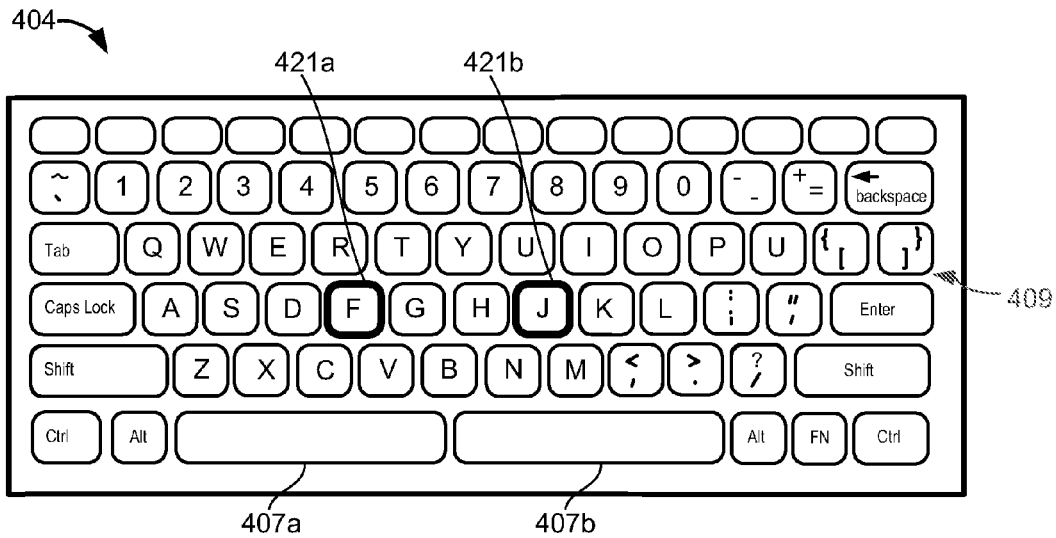
FIGS. 4A-4B are top-down views of the dual-mode input device according to an example of the present invention.
Figure 4B:
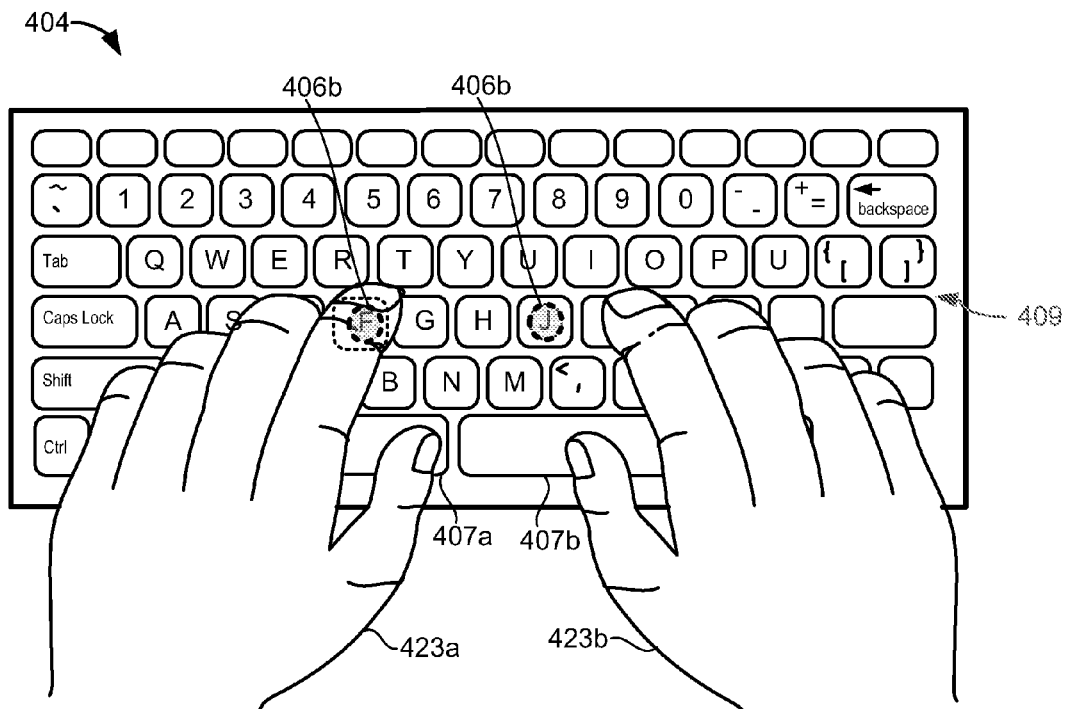

FIGS. 4A-4B are top-down views of the dual-mode input device according to an example of the present invention. As shown in one example embodiment, the input device 404 resembles a standard keyboard layout having rows of mechanical keys 409 in which a split spacebar key is positioned on a bottom row thereof. In addition, a plurality of optical sensors 406a and 406b, as shown in FIG. 4B, is formed beneath the rows of mechanical keys 409, and in particular, corresponds in position to the "F" character key 421a and "J" character key 421b (FIG. 4A ). By including optical sensors 406a and 406b coincident with the "F" and "J" keys 421a and 421b and splitting the traditional spacebar key, the appearance of the keyboard 404 is thereby simplified. Moreover, each spacebar key 407a and 407b may operate independently to effect a space character (i.e., text input mode), or simultaneously to temporarily change the function of the "F" and "J" keys 421a and 421b to mouse/multi-touch operating mode. Specifically, depression of both spacebar keys 407a and 407b activates the optical sensors and switches the operating mode from text input mode to a multi-touch operating mode. Generally, normal typing uses one side of the space bar—and one hand—to enter a space character. It is therefore possible to depress both activation keys 407a, 407b simultaneously with either thumb of the user's hands 423a, 423b as well as by using both thumbs. In addition, programming logic may be used to define a maximum time delay before the depression of each half of the spacebar causes the mode state to change so as to not interfere with normal text input.

Figure 5:
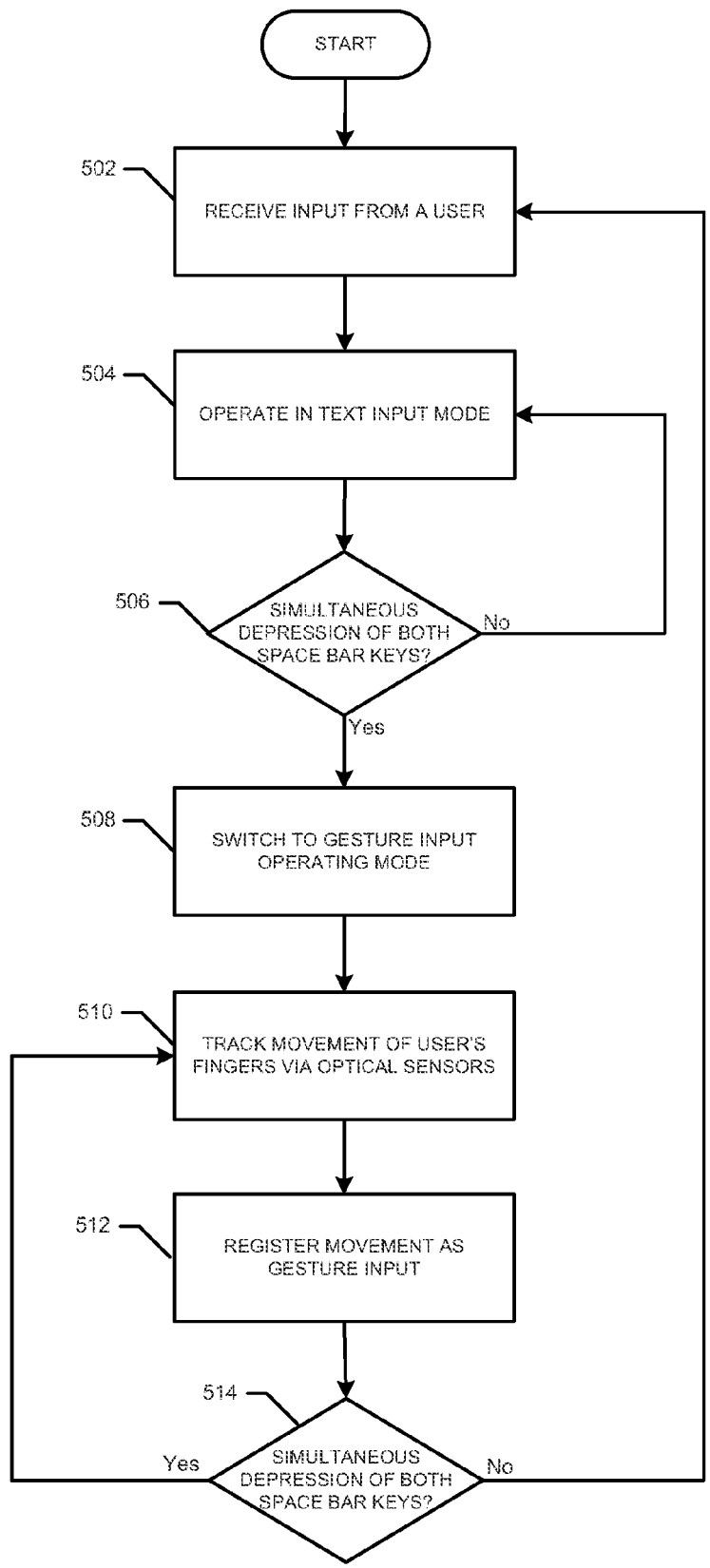
FIG. 5 is a simplified flow chart of the processing steps for the dual-mode input device according to an example of the present invention.

FIG. 5 is a simplified flow chart of the processing steps for the dual-mode input device according to an example of the present invention. In step 502, the processing unit receives input from an operating user. The initial form of input may be depressing any one of the plurality of mechanical keys or depressing each of the two spacebar keys. Initially, the input device may be configured to operate in a text input mode in step 504. If, however, the processor determines that the user has simultaneously activated/depressed both spacebar keys in step 506, then the processing unit switches the input device from a text input mode to a gesture input mode in step 508. While in the gesture input mode (i.e., while spacebar keys are depressed), the optical sensors are activated in step 510 so as to continually detect movement of the user's fingers over the keyboard area. According to one example embodiment, normal text entry is also disabled by the processing unit while in the gesture input mode. Furthermore, in step 512, the tracked movement is registered as a gesture input for navigating the user interface shown on the display. For example, a left to right movement from a user's finger—as positioned above the keyboard—would cause the cursor and indicator to move from left to right on the display screen. Similarly, a pinch movement (e.g., closing index finger and thumb) or opposite movement (e.g., expanding index finger and thumb) may cause the display to zoom in or zoom out respectively.

Embodiments of the present invention provide a multi-mode input device. Many advantages are afforded by the dual-mode input device. For instance, the dual-mode input device effectively combines keyboard and navigation functions in a simplified and robust keyboard design, thus streamlining and reducing manufacturing costs. Furthermore, examples of the present invention efficiently provide keyboard, mouse, and multi-touch functionality without any movement of the hands from their natural home position on the keyboard.

Furthermore, while the invention has been described with respect to exemplary embodiments, one skilled in the art will recognize that numerous modifications are possible. For example, although exemplary embodiments depict an all-in-one computer as the representative computing device, the invention is not limited thereto. For example, the computing device and display may be a notebook computer, a netbook, a tablet personal computer, a television monitor, a smartphone, or any other electronic device capable of accepting text and mouse-related input.

Furthermore, the optical sensors may lie coincident with any character or key on the input device, rather than the "F" character key and "J" character key. Similarly, the mode activation keys may be assigned to any key on the keyboard conducive to easy depression by the user as opposed to the spacebar keys described in the examples discussed above. Thus, although the invention has been described with respect to exemplary embodiments, it will be appreciated that the invention is intended to cover all modifications and equivalents within the scope of the following claims.

What is claimed is:

1. A dual-mode input device, the device comprising;
an input surface having an input plane: and
at least one image sensor having a central projection plane that lies perpendicular to the input plane,
wherein the image sensor is configured to detect multi-finger gesture input from a user, wherein the input device is configured to operate in alternative modes, said alternative modes including a text input mode in which text can be entered by depressing at least some of the mechanical keys, said alternative modes including a gesture input mode in which a user can control the device using multi-finger gestures, and wherein the input device is configured to operate in the text input mode when, while in the gesture input mode exactly one of a first spacebar key and a second spacebar key is depressed by the operating user, or when neither the first spacebar key nor the second spacebar key are depressed by the operating user.

2. The input device of claim 1, wherein the input device is a keyboard having a plurality of mechanical keys including a first space bar key and a second space bar key.

3. The input device of claim 1, wherein the input device is switched from the text input mode to gesture input mode while the user simultaneously depresses both the first space bar key and the second space bar key.

4. The input device of claim 1, wherein the image sensor is an infrared sensor.

5. The input device of claim 1, further comprising:
a plurality of image sensors positioned within a central region of the keyboard.

6. The input device of claim 4, wherein a first image sensor is located coincident with an "F" character key, and a second image sensor is located coincident with a "J" character key.

7. A method for providing dual-mode input for a device, the method comprising:
determining an operating mode for an input device having an input surface plane and at least one image sensor, said operating mode being either a text-input mode in which text can be entered by pressing mechanical keys or a gesture input mode in which the device can be controlled by multi-finger gestures, wherein the input device is a keyboard having a first space bar key and a second space bar key, and
switching from the text-input mode to the gesture input mode in response to the user simultaneously depressing both the first space bar key and the second space bar key, wherein the image sensor has a central projection plane that is perpendicular to the input surface plane and is configured to detect multi-finger gesture input from a user.

8. The method of claim 7, further comprising:
operating in text-input mode upon detecting the presence of an operating user.

9. The method of claim 7, further comprising:
tracking movement of the user's fingers via the at least one image sensor while the input device is operating in the gesture input mode.

10. The method of claim 7, wherein a first image sensor is located coincident with an "F" character key, and a second image sensor is located coincident with a "J" character key.

11. A dual-mode keyboard comprising:
an input surface having an input plane;
a plurality of mechanical keys including a first spacebar key and a second spacebar key; and
a first image sensor and a second image sensor positioned within the keyboard, wherein both the first image sensor and the second image sensor have a central projection plane that lies perpendicular to the input plane,
wherein both the first image sensor and the second image sensor are configured to detect multi-finder gesture input associated with an operating user,
wherein the keyboard is configured to switch to the text input mode from the gesture input mode when a single spacebar is depressed.

12. The keyboard of claim 11, wherein the input device is configured to switch from the gesture-input mode to the text input mode when either the first spacebar key or second spacebar key is depressed by the operating user.

13. The keyboard of claim 12, wherein the keyboard is switched from the text input mode to the gesture input mode while the user simultaneously depresses both the first spacebar key and the second spacebar key.

14. The keyboard of claim 11, wherein both the first image sensor and the second image sensor are infrared sensors.

15. The keyboard of claim 14, wherein the first image sensor is located coincident with an "F" character key, and the second image sensor is located coincident with a "J" character key.

\* \* \* \* \*

UNITED STATES PATENT AND TRADEMARK OFFICE
CERTIFICATE OF CORRECTION

PATENT NO. : 8,686,946 B2
APPLICATION NO. : 13/081546
DATED : April 1, 2014
INVENTOR(S) : Bradley Neal Suggs It is certified that error appears in the above-identified patent and that said Letters Patent is hereby corrected as shown below:

In the Claims

In column 4, line 62, in Claim 1, delete "comprising;" and insert -- comprising: --, therefor.

In column 4, line 63, in Claim 1, delete "plane:" and insert -- plane; --, therefor.

In column 6, line 23, in Claim 11, delete "multi-finder" and insert -- multi-finger --, therefor.

Signed and Sealed this
Fifteenth Day of July, 2014

Michelle K. Lee
*Deputy Director of the United States Patent and Trademark Office*